(12) United States Patent
Wolff et al.

(10) Patent No.: US 12,538,859 B2
(45) Date of Patent: Feb. 3, 2026

(54) ARRANGEMENT AND METHOD FOR GUIDING AN AGRICULTURAL VEHICLE IN A FIELD WITH SENSOR FUSION

(71) Applicant: Deere & Company, Moline, IL (US)

(72) Inventors: Kilian Wolff, Mandelbachtal (DE); Eric R. Anderson, Ames, IA (US); Akshay Kumar, Kaiserslautern (DE); Paul Parage, Strasbourg (FR); Uwe Vollmar, Rhineland-Palatinate (DE)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 18/741,163

(22) Filed: Jun. 12, 2024

(65) Prior Publication Data

US 2025/0024771 A1    Jan. 23, 2025

(30) Foreign Application Priority Data

Jul. 21, 2023    (DE) .......................... 102023119302.3

(51) Int. Cl.
*A01B 69/00* (2006.01)
*A01B 69/04* (2006.01)

(52) U.S. Cl.
CPC .......... *A01B 69/001* (2013.01); *A01B 69/008* (2013.01)

(58) Field of Classification Search
None
See application file for complete search history.

(56) References Cited

U.S. PATENT DOCUMENTS

| 6,445,983 | B1 | 9/2002 | Dickson et al. | |
| 9,783,230 | B2 * | 10/2017 | Hafner | B62D 15/0275 |
| 2009/0204281 | A1 | 8/2009 | Mcclure et al. | |

(Continued)

FOREIGN PATENT DOCUMENTS

| DE | 102016209437 A1 | 11/2017 |
| DE | 102019203651 A1 | 9/2020 |

(Continued)

OTHER PUBLICATIONS

Xiaojun Wan et al., Automatic Navigation System with Multiple Sensors, Computer and Computing Technologies in Agriculture, vol. II. CCTA 2007, The International Federation for Information Processing, vol. 259. Springer, Boston, MA, pp. 777-784.

(Continued)

*Primary Examiner* — Shelley Chen (57) ABSTRACT

An image processing system is configured to identify features of the field in the image signals of the visual sensor system and, on the basis of the identified features, to create a first path for the vehicle. A navigation unit is configured to determine the position of a reference point on the vehicle. An electronic memory is configured to store waypoints for a second path of the vehicle to be driven. A path calculator is configured to convert the first and/or second path into a common coordinate system. A fusion unit is configured to fuse the first path and the second path and, based on the fused path thus obtained, to provide a signal to a steering control system to steer the vehicle along the fused path and/or to store waypoints for positions passed by the vehicle calculated on the basis of the fused path in the memory.

10 Claims, 5 Drawing Sheets

(56) References Cited

U.S. PATENT DOCUMENTS

| | | | |
|---|---|---|---|
| 2015/0198953 A1* | 7/2015 | Peake | B62D 15/025 |
| | | | 701/23 |
| 2017/0357262 A1* | 12/2017 | Dix | G05D 1/0231 |
| 2018/0009106 A1* | 1/2018 | Linlor | B25J 9/1664 |
| 2020/0056895 A1* | 2/2020 | Nagy | G01C 21/343 |

FOREIGN PATENT DOCUMENTS

| | | | | |
|---|---|---|---|---|
| EP | 1266553 A2 | 12/2002 | | |
| EP | 2954772 A1 | 12/2015 | | |
| EP | 3146825 A1 | 3/2017 | | |
| KR | 20220135045 A | * | 10/2022 | B60L 53/305 |
| KR | 20230001949 A | * | 1/2023 | G05D 1/0221 |
| KR | 20230049792 A | * | 4/2023 | B60W 30/10 |
| KR | 20240034273 A | * | 3/2024 | G05D 1/43 |
| KR | 102691506 B1 | * | 8/2024 | B60W 30/10 |
| WO | WO 2008150418 A1 | | 12/2008 | |
| WO | WO 2018067473 A1 | | 4/2018 | |
| WO | WO-2023201646 A1 | * | 10/2023 | H04W 4/44 |

OTHER PUBLICATIONS

F. Rovira-Más et al., Kalman filter for sensor fusion of GPS and Machine Vision, The 2006 ASABE Annual International Meeting, St. Joseph, Michigan, USA, pp. 1-15, Jul. 9-12, 2006.

* cited by examiner

ARRANGEMENT AND METHOD FOR GUIDING AN AGRICULTURAL VEHICLE IN A FIELD WITH SENSOR FUSION

RELATED APPLICATIONS

This application claims the right of priority under 35 U.S.C. § 119 based on German application number, 10 2023 119 302.3, filed Jul. 21, 2023 (German document reference number 2023072111215800DE) which is incorporated herein by reference in its entirety.

FIELD

This disclosure relates to an arrangement and method for guiding an agricultural vehicle in a field.

BACKGROUND ART

In certain prior art, a vehicle can be steered autonomously in a field to allow an operator of the vehicle to focus on monitoring and controlling the work, such as tillage, spreading chemicals or harvesting crops. For example, a steering system of the vehicle may generate a steering signal by interacting with a navigation system and a map of the paths to be driven. In other prior art, steering systems are based on an image signal from a camera, visual sensor system, or an active, a scanning sensor (e.g., Light Detection and Ranging (LIDAR)) to recognize features in the field that are used to evaluate a path to be traveled. The recognized features may be cultivation boundaries that entail a change in the soil profile, lanes, rows of plants, swaths and/or the edge of a crop that is still standing and to be harvested.

Some prior art steering systems provide for a fusion (merging, combining) of signals provided by a navigation system and a visual sensor system to attempt to provide accurate guidance data. However, if the sensor fusion applies a separate calculation of the lateral deviation and the heading angle of the vehicle for the visual sensor system and the navigation system (e.g., which relies on a previously stored path) and if guidance information is transformed into a common coordinate system by a fuzzy logic, essential guidance information is susceptible to loss. In particular, the guidance data that relates to a possible curvature of the future course of the path to be driven is vulnerable to loss, although they were originally available.

Therefore, there is need for a method for providing a steering system for guiding an agricultural vehicle in a field with improved sensor fusion.

SUMMARY

In accordance with one aspect of the disclosure, an arrangement for guiding an agricultural vehicle in a field comprises a visual sensor system directed to the field. The visual sensor system is connected to an image processing system to communicate one or more image signals. The image processing system is configured to identify features of the field in the image signals of the visual sensor system and, on the basis of the identified features, to create a first path for the vehicle. A navigation unit is configured to determine the position of a reference point on the vehicle. An electronic memory is configured to store waypoints for a second path of the vehicle to be driven. A path calculator is configured to convert the first and/or second path into a common coordinate system. A fusion unit is configured to fuse the first path and the second path and, based on the fused path thus obtained, to provide a signal to a steering control system to steer the vehicle along the fused path and/or to store waypoints for positions passed by the vehicle calculated on the basis of the fused path in the memory.

In accordance with another aspect of the disclosure, the first path and/or the second path include or comprise more than two waypoints.

BRIEF DESCRIPTION OF THE DRAWINGS

Like reference numbers in any set of drawings indicate like features, elements, steps or procedures.

DETAILED DESCRIPTION

In accordance with one aspect of the disclosure, an arrangement for guiding an agricultural vehicle 10 in a field 58 comprises a visual sensor system 62 directed to the field 58. The visual sensor system 62 is connected to an image processing system 36 to communicate one or more image signals. The image processing system 36 is configured to identify features of the field in the image signals of the visual sensor system 62 and, on the basis of the identified features, to create a first path for the vehicle. A navigation unit 48 is configured to determine the position of a reference point on the vehicle 10. An electronic memory 72 is configured to store waypoints for a second path of the vehicle 10 to be driven. A path calculator 70 is configured to convert the first and/or second path into a common coordinate system. A fusion unit 74 is configured to fuse the first path and the second path and, based on the fused path thus obtained, to provide a signal to a steering control system 34 to steer the vehicle along the fused path and/or to store waypoints for positions passed by the vehicle calculated on the basis of the fused path in the memory 72.

In accordance with another aspect of the disclosure, the first path and/or the second path include or comprise more than two waypoints. In other words, a first path is detected by the visual sensor system 62 and the image processing system 36 based on features optically detected in the field, and a second path is read from a memory. Both paths are converted into a common coordinate system and fused to generate a steering signal for a steering control system 34 based on the fused path thus obtained, which can display the steering signal to an operator for manual steering or feed it to a steering actuator. One or both of the paths includes more than two waypoints and can therefore also represent a curvature.

In this way, the accuracy of the steering signal is improved, as it is based on an enlarged database, which also takes into account a possible curvature of the path. Alternatively or additionally, waypoints for positions covered by the vehicle 10 calculated on the basis of the merged path can be stored in a memory 72 in order to be able to follow the stored path again later or to plan a different path based on this. One or both of the paths includes more than two waypoints and can therefore also represent a curvature.

In order to avoid the problem of the vision system jumping between a series of features, it is suggested that the vision calculator or vision system is configured to select features of the field that are used to determine the first path based on the second path.

In the case of row crops, the target path for the visual sensor system 62 is determined by the rows of plants identified in the image, which also applies analogously to the navigation system 48. The steering signal is usually selected in such a way that the plants are not run over by the wheels (18, 20) of the vehicle 10. The target path can be straight or curved, depending on the respective field, among other things.

The visual sensor system 62 uses the image signals of the optical sensor (e.g., LIDAR and/or camera in stereo or mono version) to detect the positions of several plants in front of the vehicle 10. From this, a line is generated that represents the centers of gravity of the plants in the respective rows. This line can be straight or curved.

Figure 1:
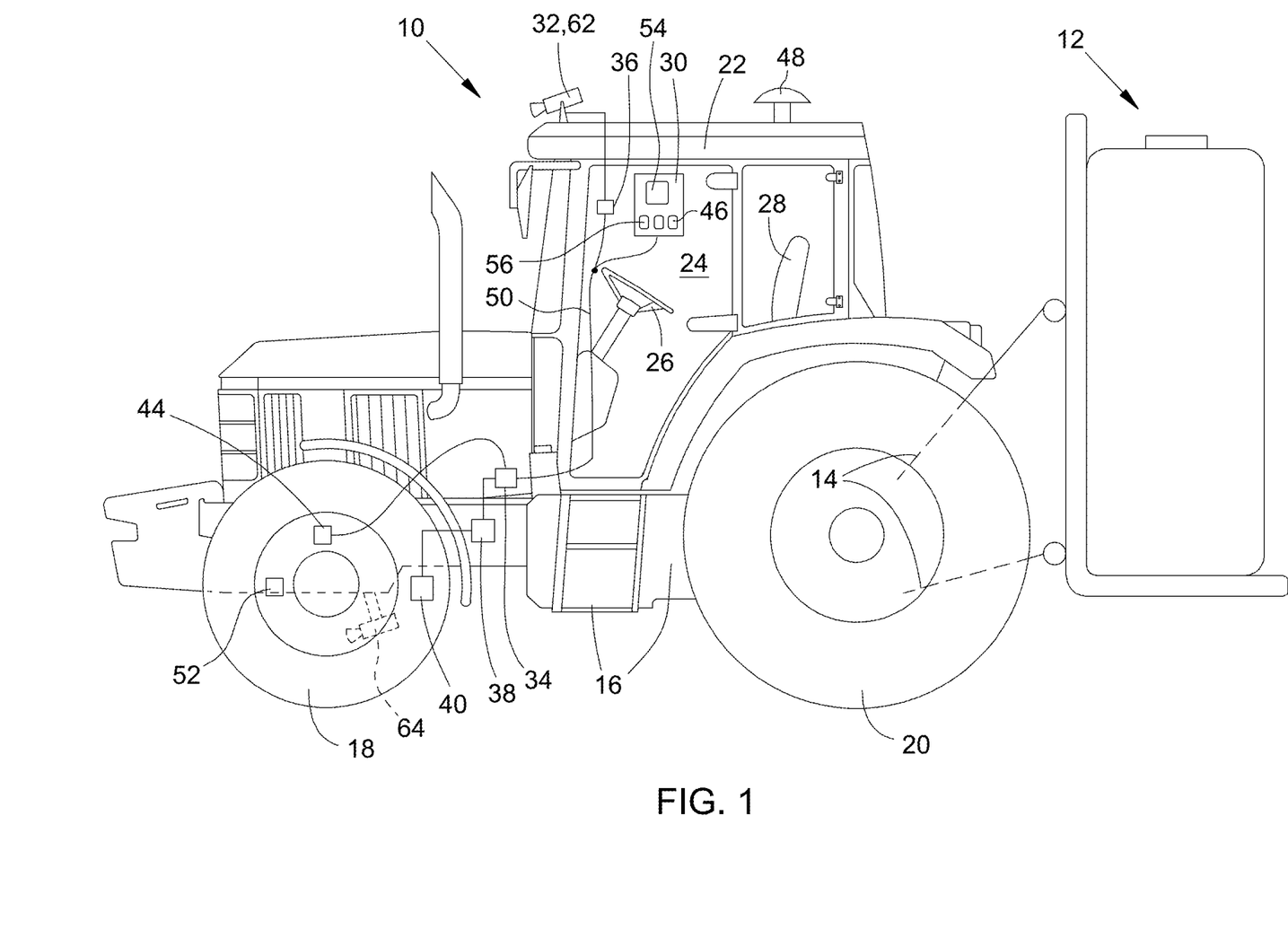
FIG. 1 is an embodiment of a lateral view of an agricultural vehicle with an arrangement for the automatic guidance of the vehicle over a field.

FIG. 1 shows a lateral view of a self-propelled agricultural vehicle 10, such as an agricultural tractor and a tool 12 in the form of a sprayer attached to a three-point linkage 14 of the vehicle 10. The vehicle 10 may be built on a supporting frame 16; the frame 16 or the vehicle 10 supports steerable front wheels 18, driven rear wheels 20 and a cab 22. An operator's workstation 24 is located within the cab. The operator's workstation 24 includes a steering wheel 26, a seat 28, pedals (not shown) and an input and output unit 30. In the following, directions, such as front and rear or sideways, refer to the forward direction of vehicle 10, which is to the left in FIG. 1.

The vehicle 10 comprises an arrangement for the automatic guidance of the vehicle over a field. The arrangement for automatic guidance comprises a visual sensor system 62 with a camera 32 designed as a mono or stereo camera (and/or a scanning, active sensor, e.g., a lidar system), an image processing system 36 connected to the image sensor of the camera 32 to communicate signals between the camera 32 and image processing system 36. Further, the arrangement for automatic guidance comprises a navigation unit 48 mounted on the roof of cabin 22, a steering signal calculation unit 46 and a steering control system 34.

The navigation unit 48 is designed to receive signals from a satellite-based navigation system (GNSS, such as GPS, Galileo, etc.). The navigation unit 48 can be equipped with an inertial navigation system to improve the accuracy of the position signals, especially in unfavorable reception conditions. In addition, the navigation unit 48 may be connected to a receiver for receiving correction signals from an appropriate system (DGPS (Differential Global Positioning System), RTK (Real-time Kinematic) to improve the precision of the navigation system signals, a steering angle sensor, and/or an odometer. A steering angle sensor 44 can detect the steering angle of the wheels 18. An odometer can detect movement or distance moved of the front wheels 18. A speed sensor can detect the rotation of the front wheels 18. A filter, such as a Kalman filter, can fuse acquired sensor signals of one or more sensors (e.g., sensors of the inertial navigation system) and the satellite-based, possibly corrected signals, e.g., by a Kalman filter. The navigation unit 48 provides a signal at regular intervals with regard to its two- or three-dimensional position and, optionally, its speed and/or orientation.

The vision system 36, the navigation unit 48, the steering signal calculation unit 46 and the steering control system 34 are connected to each other via a bus system 50, which can operate, for example, according to the protocol according to ISO 11783 or a successor thereto. The steering signal calculation unit 46 is spatially integrated in an input-and-output unit 30, which is provided with an operator interface in the form of a display unit 54 and an input device 56. The input-and-output unit 30 can perform the function of a virtual display according to ISO 11783.

The steering control system 34 is connected to a valve 38 for controlling a steering actuator 40 and to the steering angle sensor 44 for detecting the current steering angle of the front wheels 18.

Figure 2:
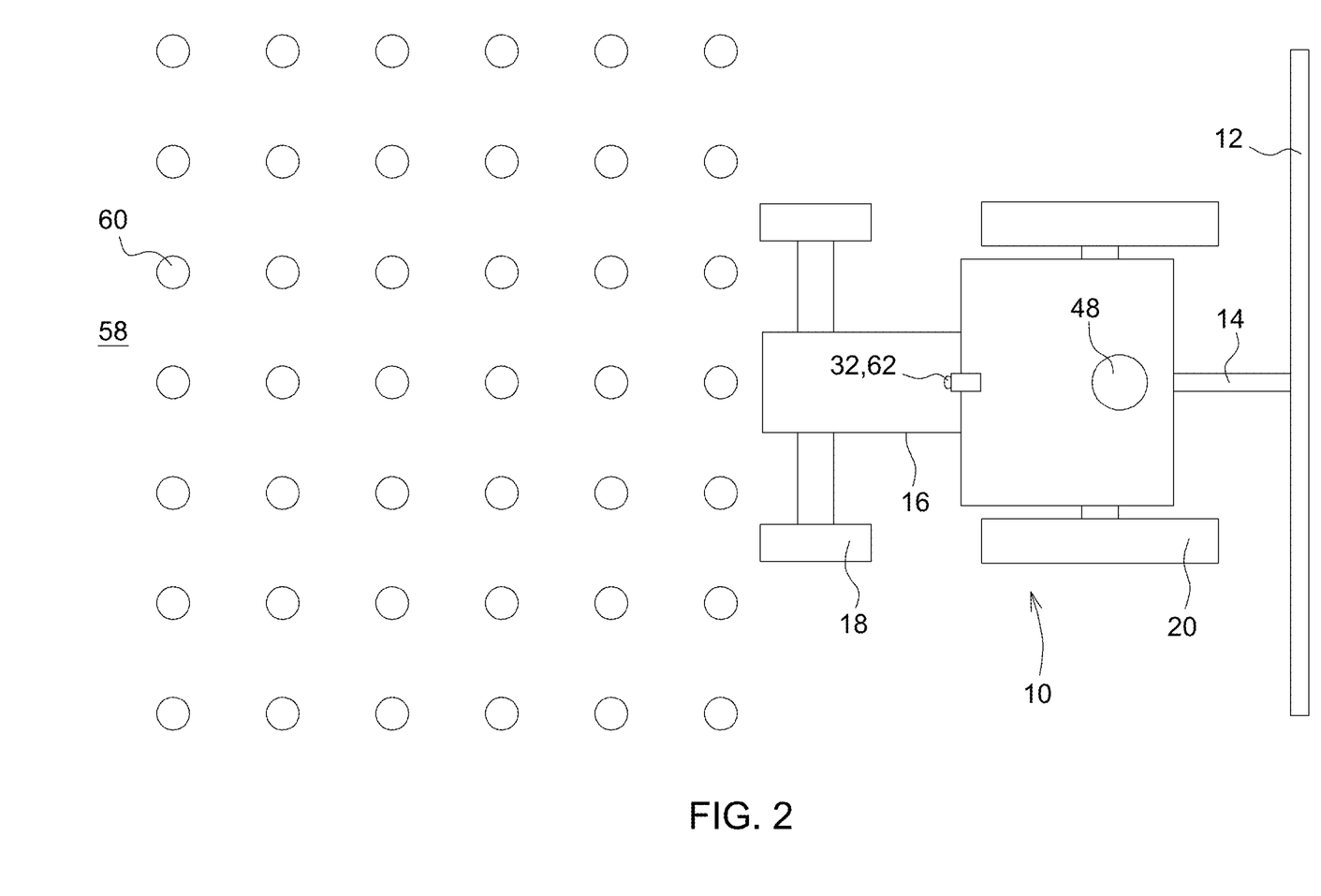
FIG. 2 is an embodiment of a top view of the vehicle when working in the field.

FIG. 2 shows a top view of vehicle 10 at work in a field 58 with plants 60 grown in rows. The steering control system 34 is controlled by the steering signal calculation unit 46 based on the (fused) signals of the visual sensor system 62 (camera 32) and the navigation unit 48 in such a way that the front wheels 18 and the rear wheels 20 travel between the rows of plants 60 without passing over the plants 60. The visual sensor system 62 can detect plants 60 and/or detect rows, tracks, or lanes between plants 60. The tool 12 could be any other type of weed removal tool (e.g., hoe) that is used to remove unwanted wild weeds between the rows of plants 60. In another embodiment, the implement could be a tillage implement, such as a plough or harrow, and the visual sensor system 62 could detect the boundary between untilled and tilled portions of the field 58. In yet another embodiment, vehicle 10 could be a harvester with a harvesting attachment or it moves a harvesting device (e.g., a mower or cutter) across the field and the visual sensor system 62 detects a standing edge of the crop that has not yet been harvested or a swath of crop to be collected by a pick-up.

Figure 3:
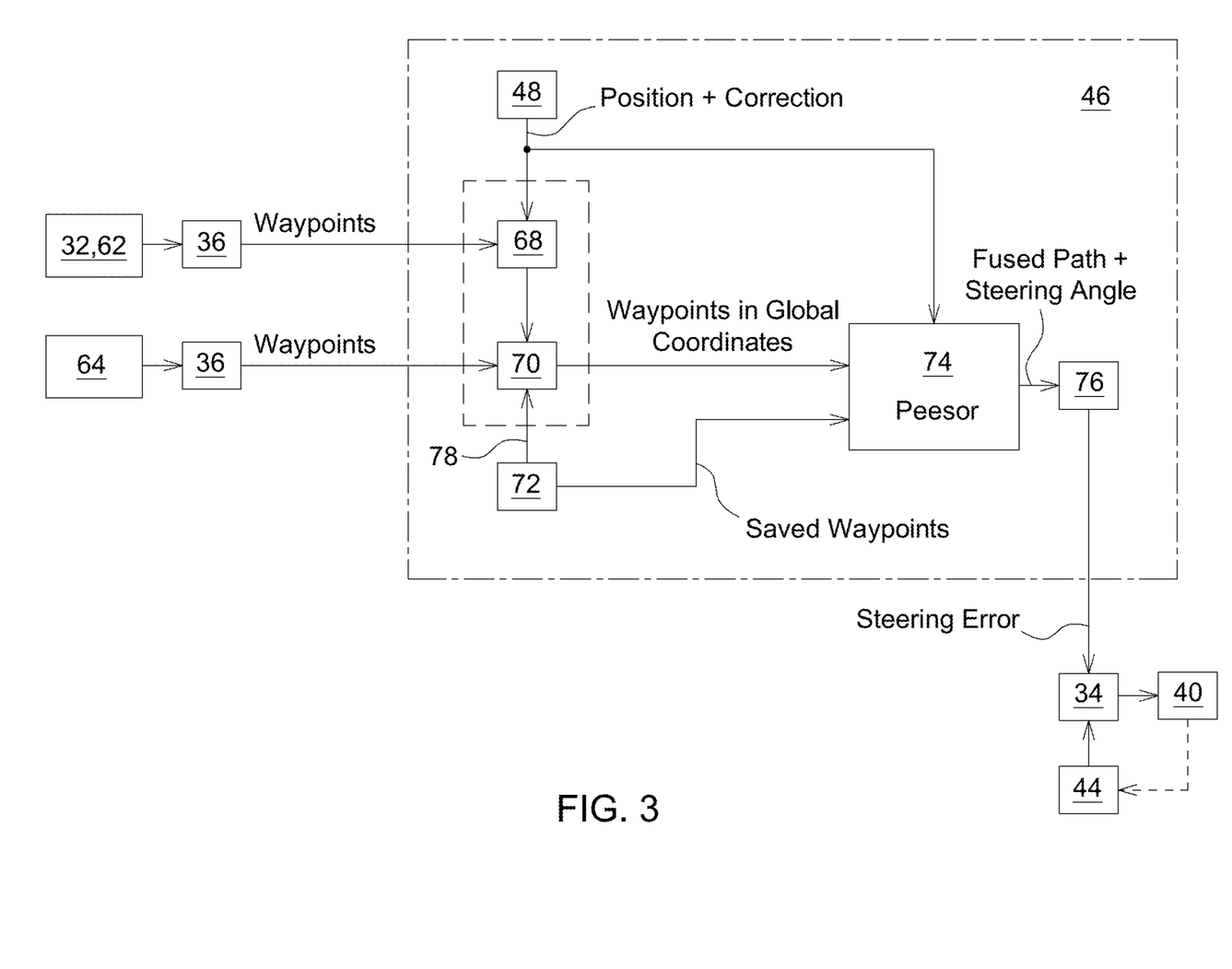
FIG. 3 is an embodiment of a schematic diagram of the arrangement for guiding the vehicle.

FIG. 3 shows a diagram of the arrangement for the automatic guidance of vehicle 10. The visual sensor system 62 with the camera 32 feeds the image signal of the camera 32 to the image processing system 36. A further camera 64, located on the underside of the vehicle 10, which may be designed as a stereo or mono camera or any other camera, such as a three-dimensional PMD camera, feeds its image signal to the image processing system 36. Either only one camera 32 or 64 is active at the same time, or they are both active and their signals are fused (e.g., by a path calculator 70).

The image processing system 36 calculates, in a known manner, on the basis of the image signals of the camera 32 and/or 64 and the features of field 58 contained therein and identified by the image processing system 36, a (first) path to be taken by vehicle 10 in the future. For this purpose, it is possible to proceed as described above with regard to FIG. 2. This first path, built from waypoints, does not necessarily have to be straight, but can have any shape, such as one or more curvatures. The first path is calculated using a coordinate system related to vehicle 10. The origin (e.g., or reference point) of the coordinate system may be referenced to the camera 32, 64. Usually, the path is calculated in two-dimensional coordinates, although it would also be conceivable to use three-dimensional coordinates (including elevation information). Herein, the images of the cameras 32 and/or 64 are processed one after the other and compared with each other as they drive along the path, so that individual features are tracked over several images ("frames").

The first path calculated in this way on the basis of the signals of the camera 32 or camera 64 is fed to a path calculator 70, which is also fed signals from a location calculator 68. The location calculator 68 receives signals regarding the current position from the navigation unit 48, which are converted by the location calculator 68 to the position of the reference point of the vehicle (i.e., the camera 32 and/or camera 64). The path calculator 70 provides the first path at its output, which is now not related to the coordinate system used by the image processing system 36. The path calculator 70 provides the first path at its output that can be related to a point of vehicle 10 and to absolute, georeferenced coordinates. If both cameras 32, 64 should be active, the path calculator 70 can merge their signals into a single path in a known way. At the output of the path calculator 70 there is therefore a first path consisting of several waypoints in a georeferenced coordinate system (in "world coordinates").

The output signal of the path calculator 70 is fed to a fusion unit 74, which also receives data from a memory 72 in which stored waypoints for a second path to be covered are stored. These waypoints for the second path may have been generated during a previous processing of field 58, such as during the sowing of the plants 60, or they may have been recorded during the ongoing processing of field 58 during a previous path over the field 58 adjacent to the current path and moved by the working width or a multiple thereof to the side. The fusion unit 74 retrieves the stored waypoints from memory 72 based on the current position of the navigation unit 48. The second path can also contain more than two waypoints, to include one or more curvatures, although in the simplest case the second path can be a straight line (e.g., A-B line).

Accordingly, the fusion unit 74 has two paths, a first path and a second path. Each of the two paths represents a set of waypoints that refer to one and the same coordinate system, namely the global coordinate system. The first set of waypoints is based on the visual sensor system 62 (camera 32 and/or 64) and the second set of waypoints is based on the path stored in memory 72, which is retrieved therefrom based on the signals of the navigation unit 48. Both paths define the path to be covered by a defined reference point of vehicle 10 (e.g., the center of the rear axle). In another embodiment, it would be conceivable to use for the first and second paths a coordinate system referring to any reference point on vehicle 10, such as any of the following reference points: the center of the rear axle of vehicle 10 or the navigation unit 48 or the camera 32, 64.

Figure 5:
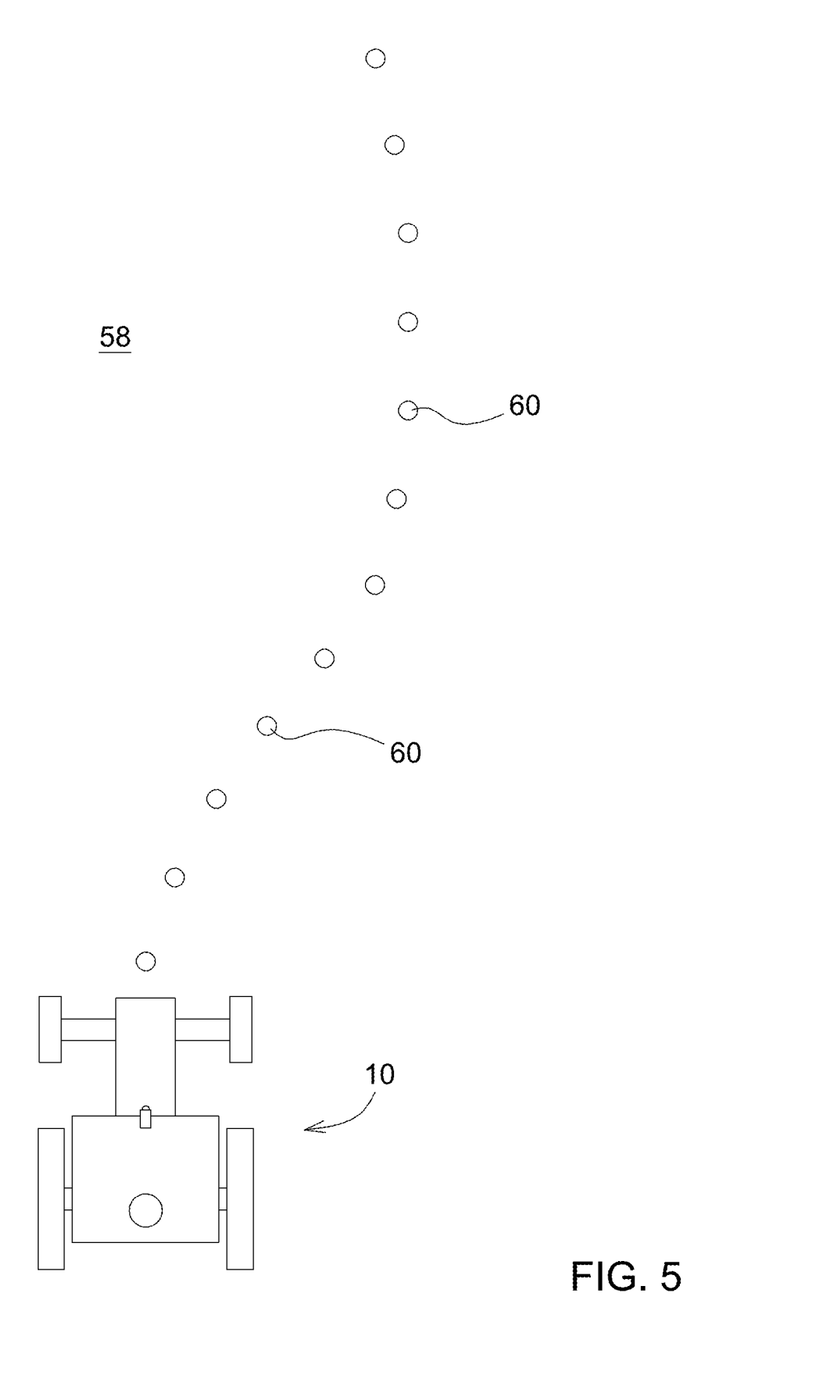
FIG. 5 is an embodiment of a top view of the vehicle when working the field with a curved path.

According to the present disclosure, two or more waypoints from one or both paths are provided and fused to determine the fused path to be traveled. The fused path to be traveled is not based only on the lateral deviation of the vehicle 10 from the path to be travelled and the angle between vehicle longitudinal axis of vehicle 10 and the path longitudinal axis of the path to be travelled, where the vehicle longitudinal axis and the path longitudinal axis are each approximated as straight lines. In particular, the method and arrangement according to the disclosure has the advantage that a more accurate steering signal can be provided in the case of curvatures in the paths because the curvature of the path is taken into account during fusion, as shown in the example of FIG. 5. For example, in FIG. 5 the illustrative plants 60, which lie in the field of view of camera 32, are detected and used to calculate a first path whose points correspond to the positions of the respective plants 60. For illustrative purposes, the stored second path would also be curved in the example according to FIG. 5. Such curved paths can be caused by the shape of the field or obstacles thereon to be avoided. For the fusion, any curvature in the first path and the second path would not be approximated as a straight line for accuracy.

During fusing, the fusion unit 74 may take into account the accuracies of the individual points of the paths. The respective accuracies can be calculated separately for the individual points. In the case of the visual sensor system 62, the accuracy can be determined, in particular, in a known manner on the basis of the quality of the image signals of the camera 32, 64. Naturally, therefore, more distant features, such as plants, are assigned less accuracy than closer features. The situation will be similar with the signals of navigation unit 48, since positions further into the future are subject to greater uncertainties than actual positions. By using a common coordinate system and using a higher number of waypoints than the previous two waypoints, the accuracies associated with the different waypoints can also be taken into account separately.

Figure 6:
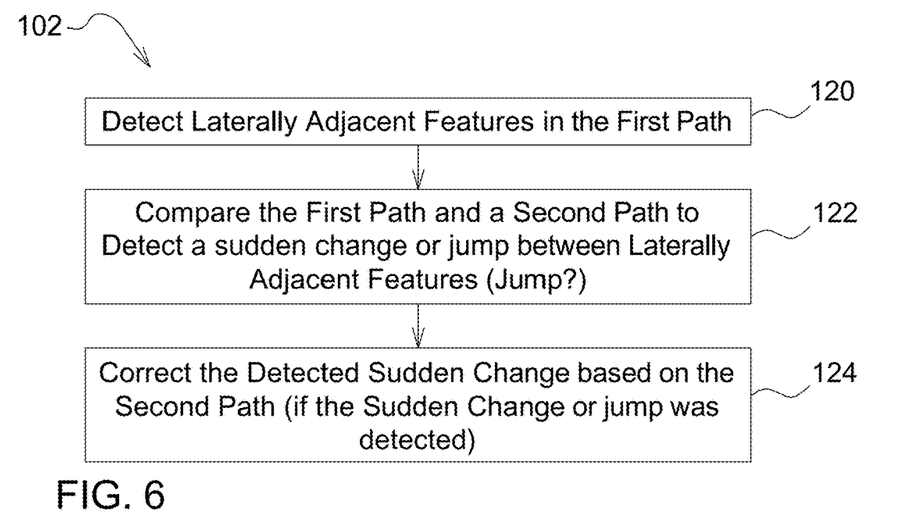
FIG. 6 is an embodiment of a flow diagram regarding the selection of the visually tracked paths.

In particular, the path calculator 70 (or the vision system 36) is able to select features (e.g., rows of plants 60) of field 58 that are used to determine the first path on the basis of the second path, as shown in FIG. 6 showing aspects of step 102. For this purpose, the path calculator 70 (or the image processing system 36, which receives corresponding information from the path calculator 70) can detect several laterally adjacent features on the field (e.g. the rows of plants) in the first pathway (step 120) or first path and, on the basis of a comparison between the first and second pathways (step 122), in the event of an unexpected, abrupt change in the first pathway, detect a sudden change in the image processing system 36 between laterally adjacent features used to determine the first pathway and, if necessary, correct it on the basis of the second pathway (step 124) or second path.

In this way, possible jumps in the first, visually recognized path can be recognized and compensated. Accordingly, if the first path, determined on the basis of the visual sensor system 62, contains sudden jumps indicating that the vision system 36 has jumped one or more rows to the left or right, i.e. a different row of plants 60 than before is used as a reference row to be tracked and brought into lateral adjustment with a reference point of the vehicle 10 (which represents, for example, that row, which is to correspond to the center of the vehicle 10 or another reference point of the vehicle 10), the second path to be traveled provided by the memory 72 can be used to tell the path calculator 70 (and/or the vision system 36) which of the rows of plants 60 is to be regarded as the reference row, as shown in FIG. 3 by the arrow 78.

In conjunction with FIG. 3 and FIG. 6, in an alternate embodiment, the procedure described in the two preceding paragraphs supports the automatic selection of the path to be followed by the image processing system 36 on the basis of the navigation system 48 can be applied if both paths consist of straight lines. Accordingly, in the alternate embodiment, a fusion unit 74 calculates a fused path on the basis of both paths and, based on this, the lateral deviation of vehicle 10 from the path and the angle between the vehicle longitudinal axis of vehicle 10 and the path longitudinal axis of the path, using the signals of the navigation unit 48 and/or of the visual sensor system 62. The nominal, desired path to be traveled is the fused path and the actual position and direction of the vehicle 10 are provided based on the fused signals from the navigation unit 48 and from the visual sensor system 62 in a manner analogous to the fusion of both paths, here however serving to determine the deviation of the lateral position and orientation of the vehicle from the desired path. The errors resulting from the comparison (lateral deviation, angle) are fed by the fusion unit 74 to an external control loop 76, which in turn feeds a steering error signal to the steering control system 34, such as a signal representing a possible deviation between the current steering angle of the front wheels 18 and the steering angle appropriate for driving the path. The steering control system 34 controls the steering actuator 40 and receives feedback signals from the steering angle sensor 44. The steering control system 34 can be designed in a well-known manner as a control (taking into account feedback values for a variable to be set, in this case the steering angle), such as a proportional integral derivative (PID) controller. Similarly, the outer control loop 76 may also be designed as a control system and obtain a feedback value with regard to the steering angle of the front wheels 18 from the steering control system 34.

This procedure can be used not only when actually driving over the field, but also when turning in the headland. There, useful information can be expected from the visual sensor system 62 at least if there are lanes or tramlines from previous processing operations, so that the steering in the headland can also be based on the fused signals of the visual sensor system 62 and the signals of the navigation unit 48. If useful features for the visual sensor system 62 are missing in the headland, the visual sensor system 62 can provide signals again at the latest when the actual field is in its field of vision and thus facilitate entry into the next lane or row.

In one possible embodiment, the waypoints calculated by the fusion unit 74 in step 108 for the positions traveled by the reference point of the vehicle 10 are stored in memory 72 so that they can later be used by the vehicle 10 or any other vehicle (e.g., a harvester) as a second path to drive the path again or to be able to base a route planning on it. This makes it possible, for example, to drive across the field for the first time after a sowing process, when the plants have emerged, based on the signal of the camera 32, which can possibly be fused with a position of the plants stored during the sowing process, and to map the path and to use the mapped path at later passes when the plants have become larger and may be less recognizable, or to be able to use it as a reference path for planning.

As shown in FIG. 3, the location calculator 68, the path calculator 70, the memory 72, the fusion unit 74 and the outer control loop 76 are integrated into the steering signal calculation unit 46. They can be implemented as separate hardware components or are formed by one or more processors of the steering signal calculation unit 46 or the input and output unit 30 and software running on them.

Figure 4:
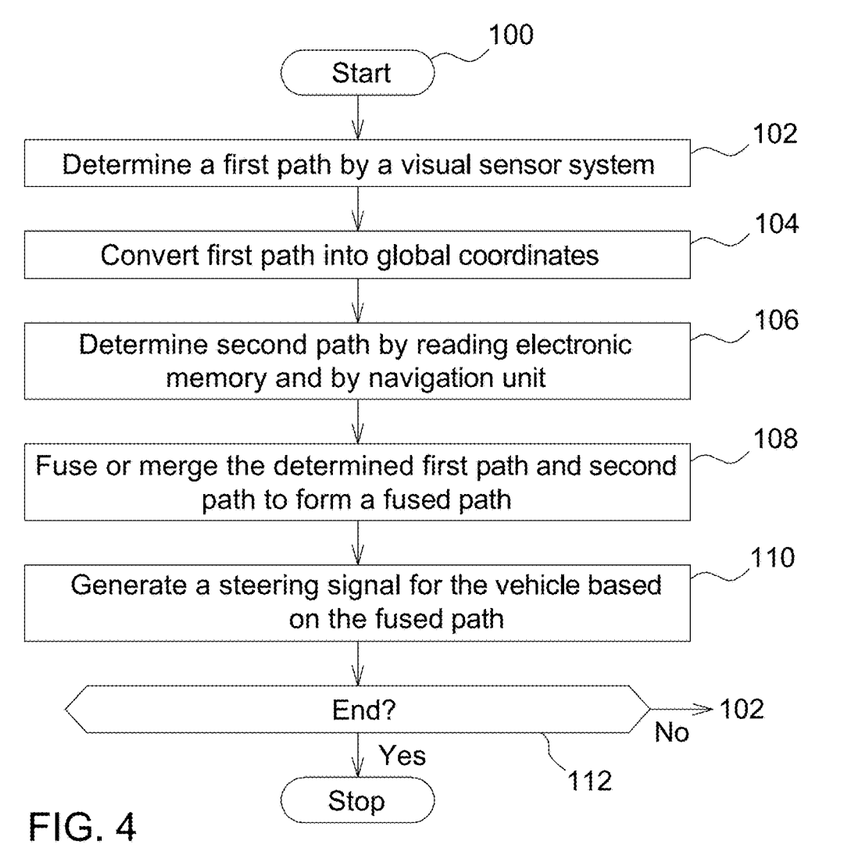
FIG. 4 is an embodiment of an illustrative flowchart according to which the arrangement of FIG. 3 works.

FIG. 4 shows a flowchart according to which the arrangement of FIGS. 1 to 3 works. After starting in step 100, a first path is determined in step 102 using the visual sensor system 62 and converted into a global coordinate system in step 104. In step 106, a second path is determined using memory 72 and navigation unit 48, and in step 108, both paths are merged to form a fused path. In step 110, a steering signal is generated based on the fused path, and as long as field 58 has not yet been processed (step 112), step 102 is continued.

What is claimed is:

1. An arrangement for guiding an agricultural vehicle over a field, the arrangement comprising:
    a visual sensor system directed at the field and connected to an image processing system, the image processing system configured to identify features in the field in the image signal of the visual sensor system and to calculate a first path to be driven by the vehicle based on the identified features;
    a navigation unit is configured to determine the position of a reference point on the vehicle;
    an electronic memory to store waypoints for a second path of the vehicle to be passed;
    a path calculator is configured to convert the first path or the second path, or both, into a common coordinate system; and
    a fusion unit configured to fuse the first path and the second path into a fused path and to feed a signal to a steering control system based on the fused path to control the vehicle to drive along the fused path that comprises a merged path; the fusion unit configured to store fused-path waypoints for positions to be passed by the vehicle calculated on the basis of the fused path in a memory, wherein the first path, the second path, or both, each comprise more than two waypoints.

2. The arrangement according to claim 1, wherein the path calculator or the image processing system is configured to select features of the field to determine the first path on the basis of the second path.

3. The arrangement according to claim 2, wherein the path calculator or the image processing system is configured to detect several laterally adjacent features in the field in the first path and to detect in the first path a sudden change between laterally adjacent features used to determine the first path and to correct the first path if necessary on the basis of the second path.

4. The arrangement according to claim 3, wherein the features are plants arranged in rows.

5. The arrangement according to claim 1, wherein the first and/or second path includes one or more curvatures.

6. The arrangement according to claim 1, wherein the path calculator is configured to convert the first path provided by the image processing system into a georeferenced coordinate system or coordinate system based on a reference point on the vehicle on the basis of the position determined by the navigation unit.

7. The arrangement according to claim 1, wherein the fusion unit is configured to calculate, on the basis of the fused path and the signals from the navigation unit and from the visual sensor system, a lateral deviation of the vehicle from the fused path and a deviation of the forward direction of the vehicle from the direction suitable for driving the fused path and to feed both deviations to the steering control system.

8. The arrangement according to claim 1, wherein the fusion unit is configured to take into account the waypoints of the first and second ways weighted by their accuracy during fusing.

9. The arrangement according to claim 1, wherein the steering control is configured to control a steering actuator.

10. A method for guiding an agricultural vehicle across a field, comprising the following steps:
    a visual sensor system directed at the field transmits signals to an image processing system, the image processing system is configured to identify features of the field in the image signal of the visual sensor system and calculates a first path to be driven by the vehicle;
    a navigation unit is configured to determine the position of a reference point on the vehicle;
    an electronic memory to store waypoints for a second path of the vehicle to be covered;
    a path calculator configured to transform the first path, the second path, or both into a common coordinate system, and
    a fusion unit is configured to merge the first path and the second path and to feed a signal to a steering controller on the basis of the fused path to steer the vehicle along the fused path and to store waypoints for positions passed by the vehicle, wherein the waypoints are calculated on the basis of the fused path in a memory, and wherein the first path and the second path comprise more than two waypoints and/or that the path calculator or the image processing system is configured to select features of the field to determine the first path on the basis of the second path.

* * * * *